(12) United States Patent
Takahashi

(10) Patent No.: US 9,849,592 B2
(45) Date of Patent: Dec. 26, 2017

(54) ROBOT APPARATUS, ROBOT CONTROL METHOD, PROGRAM, AND RECORDING MEDIUM

(71) Applicant: CANON KABUSHIKI KAISHA, Tokyo (JP)

(72) Inventor: Toshiya Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/853,150

(22) Filed: Sep. 14, 2015

(65) Prior Publication Data

US 2016/0075030 A1   Mar. 17, 2016

(30) Foreign Application Priority Data

Sep. 16, 2014  (JP) .................... 2014-187509

(51) Int. Cl.
*G05B 19/04* (2006.01)
*G05B 19/18* (2006.01)
*B25J 9/16* (2006.01)

(52) U.S. Cl.
CPC ........... *B25J 9/1694* (2013.01); *B25J 9/1687* (2013.01); *G05B 2219/39332* (2013.01); *G05B 2219/40032* (2013.01); *G05B 2219/41144* (2013.01); *Y10S 901/09* (2013.01)

(58) Field of Classification Search
CPC ...... B25J 9/1694; B25J 9/1633; B25J 9/1987; G05B 2219/39332; G05B 2219/40032; G05B 2219/41144; Y10S 901/09; Y10T 29/53022; Y10T 29/49764; Y10T 29/53061; Y10T 29/53057; Y10T 29/53039; Y10T 29/49822; B23P 19/12; B23P 19/107
See application file for complete search history.

(56) References Cited

U.S. PATENT DOCUMENTS 5,031,304 A * 7/1991 Shepard ................ B23P 19/102
                                                              29/700
6,141,863 A * 11/2000 Hara ...................... B25J 9/1633
                                                              29/714

(Continued)

FOREIGN PATENT DOCUMENTS

JP   H05069358 A   3/1993

*Primary Examiner* — Rachid Bendidi
(74) *Attorney, Agent, or Firm* — Canon U.S.A., Inc. IP Division

(57) ABSTRACT

A force detector provided between a robot arm and a robot hand detects forces Fx, Fy, and Fz. A robot controller performs a filtering process for the forces Fx and Fy by a first low-pass filter of a cutoff frequency $F_{c1}$, moves the robot hand so that the forces Fx and Fy become smaller, corrects a trajectory of the robot arm, performs a filtering process for the force Fz by a second low-pass filter of a cutoff frequency $F_{c2}$ having a frequency higher than the cutoff frequency $F_{c1}$, performs a threshold value determination for the force Fz, and stops the movement of the robot hand when the force Fz exceeds a threshold value during a fitting operation.

4 Claims, 6 Drawing Sheets

(56) References Cited

U.S. PATENT DOCUMENTS

| | | | |
|---|---|---|---|
| 8,396,594 B2* | 3/2013 | Okazaki | G05B 19/423 318/100 |
| 2008/0267737 A1* | 10/2008 | Hatanaka | B25J 9/1687 414/1 |
| 2011/0153076 A1* | 6/2011 | Noro | B25J 9/1687 700/245 |
| 2011/0225787 A1* | 9/2011 | Sato | B25J 9/1687 29/407.01 |
| 2013/0345848 A1* | 12/2013 | Izumi | B25J 15/0033 700/114 |
| 2014/0114477 A1* | 4/2014 | Sato | B25J 9/1664 700/250 |
| 2015/0100147 A1* | 4/2015 | Izumi | B25J 9/0087 700/117 |
| 2016/0052135 A1* | 2/2016 | Motoyoshi | B25J 9/1687 29/281.6 |

* cited by examiner

ROBOT APPARATUS, ROBOT CONTROL METHOD, PROGRAM, AND RECORDING MEDIUM

BACKGROUND OF THE INVENTION

Field of the Invention

This disclosure relates to force control of a robot arm.

Description of the Related Art

An industrial robot includes a multi-joint robot arm and a robot hand attached to a distal end of the robot arm. In a fitting operation or an operating object acquiring operation using a robot of this type, tolerance of an operating object, installation error, and positional displacement of the operating object being gripped by the robot hand may occur. Accordingly, the positional displacement in a direction intersecting a distal end shaft extending from the robot arm to the robot hand occurs between the operating object and the robot hand.

Therefore, if only position control for controlling angles of respective joints of the robot to control command values is performed, fitting failure or operating object acquiring error may occur due to positional displacement between the operating object and the robot hand. Therefore, the robot includes a force detector configured to detect a fore acting on the robot hand and performs force control of the robot arm with a control device (See Japanese Patent Laid-Open No. 5-69358).

The force control includes trajectory correction control and reached position sensing control. The trajectory correction control includes detecting a contact force generated due to positional displacement between the operating object and the robot hand during fitting or during acquisition of the operating object with the force detector, and correcting a trajectory of the robot arm so that the contact force generated in a direction intersecting a distal end shaft decreases (approaches zero). The reached position detection control includes sensing a reached position in an approaching direction, which is a direction of extension of the distal end shaft, and stopping the robot arm.

In a configuration of the robot including the force detector, an output other than a force to be detected may be added to an output of the force detector as noise due to vibrations during the operation of the robot. When performing the trajectory correction control by using the output from the force detector, the correction may become unstable due to the influence of noise. Therefore, the trajectory correction control is performed by performing low-pass filtering of the output from the force detector.

However, when performing reached position sensing control, if control is performed by filtering the output from the force detector by using a filter having the same characteristics as the case where the trajectory correction control is performed, the force generated upon reaching can be detected with only low sensitivity. Therefore, the timing at which the robot arm is stopped may be delayed. If the timing at which the robot arm is stopped is delayed, the robot hand and the force detector, that is, the robot may stop in an overloaded state.

In contrast, if the features of the filter are set so as to detect a force at a high sensitivity by placing priority on the reached position sensing control, a transient response to a force generated when reaching becomes quicker, so as to prevent the robot from becoming overloaded. However, when performing trajectory correction control, removal of a vibrational component included in a result of force detection is not sufficient. Therefore, the trajectory correction operation becomes unstable.

Accordingly, this disclosure is intended to correct in a stable manner positional displacement of a robot hand in a direction intersecting a distal end shaft, and sense that the robot hand has reached quickly in a direction of extension of the distal end shaft.

SUMMARY OF THE INVENTION

A robot apparatus of this disclosure includes: a multi-joint robot arm; a robot hand attached to a distal end of the robot arm; a force detector configured to detect a first detection force in a first direction intersecting a distal end shaft extending from the robot arm to the robot hand and a second detection force in a second direction in which the distal end shaft extends; and a control unit configured to control an operation of the robot arm so as to perform a fitting operation for fitting a gripped object gripped by the robot hand and a counterpart object to each other on the basis of trajectory data of the robot arm, and the control unit executes a first detection force correcting process that performs a filtering process for the first detection force with a first low-pass filter having a first cutoff frequency during the fitting operation; a first force control process that moves the robot hand in the first direction to reduce the first detection force to correct a trajectory of the robot arm during the fitting operation; a second detection force correcting process that performs a filtering process for the second detection force with a second low-pass filter having a second cutoff frequency which is higher than the first cutoff frequency during the fitting operation; and a second force control process that determines a threshold value for the second detection force, and stops the movement of the robot hand in the second direction when the second detection force exceeds the threshold value.

Further features of the present invention will become apparent from the following description of exemplary embodiments with reference to the attached drawings.

DESCRIPTION OF THE EMBODIMENTS

Embodiments of this disclosure will be described in detail below with reference to the drawings.

First Embodiment

Figure 1:
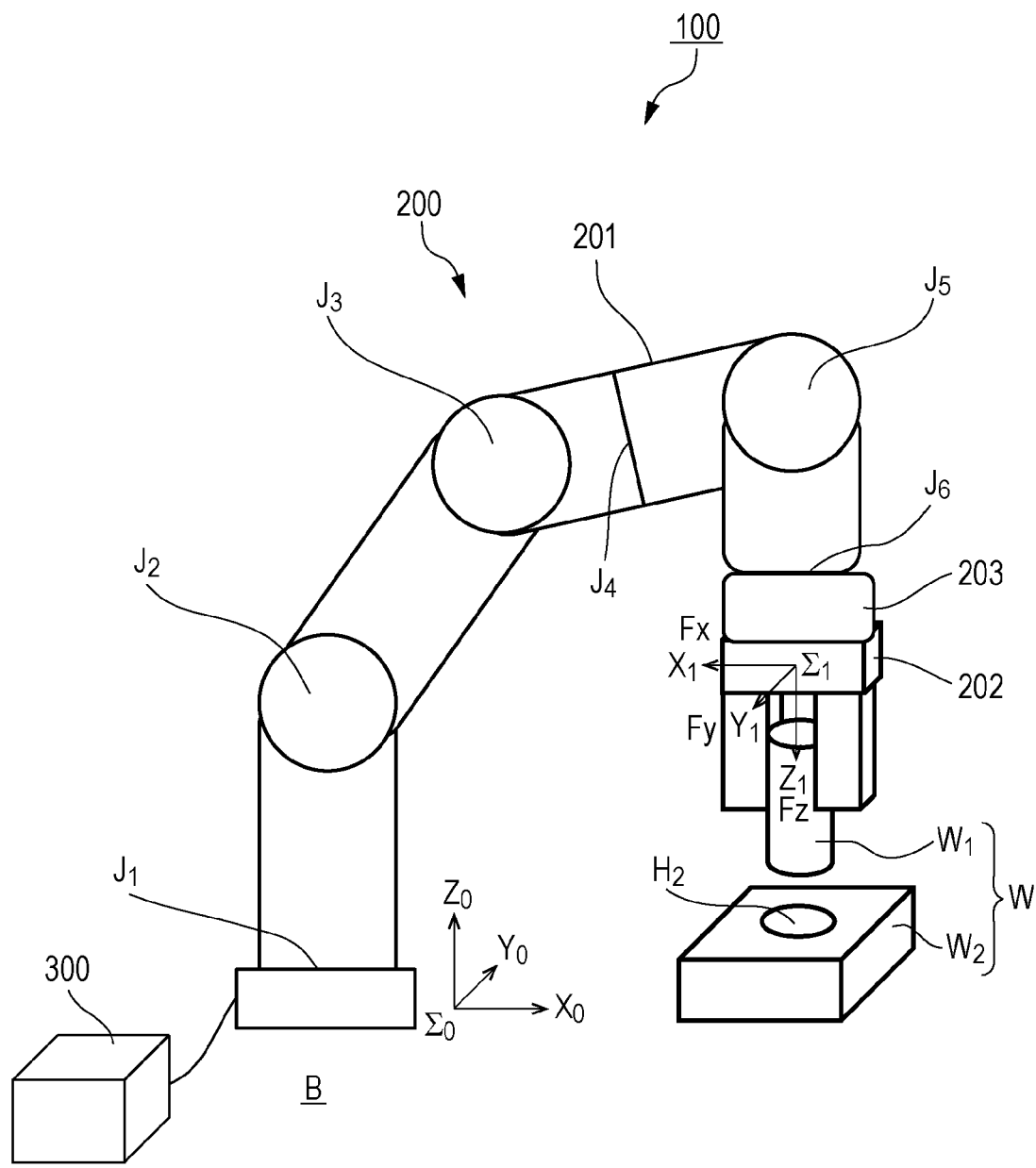
FIG. 1 is a schematic drawing illustrating a robot apparatus according to a first embodiment of this disclosure.

FIG. 1 is a schematic drawing illustrating a robot apparatus according to a first embodiment of this disclosure. FIG.

2 is a block diagram illustrating the robot apparatus according to the first embodiment of this disclosure. A robot apparatus 100 illustrated in FIG. 1 is configured to execute a method of assembling an assembly W by performing a fitting operation for fitting a gripped object and a counterpart object to each other. One of the gripped object and the counterpart object (the gripped object in the first embodiment) corresponds to a fitting object $W_1$, and the other one (the counterpart object in the first embodiment) corresponds to a fitted object $W_2$ having a hole $H_2$ into which the fitting object fits. The fitted object $W_2$ is placed on a base B. However, the fitted object $W_2$ may be gripped by another robot. The fitting object $W_1$ is a column-shaped pin, and a hole $H_2$ of the fitted object $W_2$ is a column-shaped pin hole into which the fitting object $W_1$ is fitted.

The robot apparatus 100 includes a multi-joint robot 200, and a robot controller 300 connected to the robot 200 with a cable or the like.

The robot 200 includes a multi-joint (for example, vertical multi-joint) robot arm 201, a robot hand 202, which is an end effector, and a force detector 203 configured to detect a force acting on the robot hand 202 (finger). The robot arm 201 is configured by pivotably or rotatably coupling a plurality of links to a plurality of joints $J_1$ to $J_6$. A proximal end (also referred to as proximal link, base portion) of the robot arm 201 is fixed to an upper surface of the base B. A distal end (also referred to as distal link, flange portion) of the robot arm 201 includes the robot hand 202 attached thereto via the force detector 203. Although FIG. 1 illustrates the case where the distal link of the robot arm 201 is integrally formed with the force detector 203, a case where the distal link and the force detector 203 are separately formed and the force detector 203 is fixed to the distal link with a fixture or the like is also applicable. The robot hand 202 has a plurality of fingers, and is configured to grip and release the fitting object $W_1$.

A global coordinate system $\Sigma_0$ is set to a proximal end of the robot 200 (robot arm 201). The world coordinate system $\Sigma_0$ is defined by a $Z_0$ axis perpendicular to the base B, and an $X_0$ axis and a $Y_0$ axis intersecting (orthogonal to) the $Z_0$ axis and intersecting (orthogonal to) each other.

A world coordinate system $\Sigma_1$ is set to the distal end of the robot 200 (robot arm 201). The hand coordinate system $\Sigma_1$ is defined by a $Z_1$ axis, which is a distal end axis extending from the distal end of the robot arm 201 toward the robot hand 202, and an $X_1$ axis and a $Y_1$ axis intersecting (orthogonal to) the $Z_1$ axis and intersecting (orthogonal to) each other.

The force detector 203 is so-called a force sensor and is configured to be capable of detecting a magnitude and a direction of an applied force. In other words, the force detector 203 detects forces (first detection forces) Fx, Fy in directions of the $X_1$ axis and the $Y_1$ axis (first direction) and a force (second detection force) Fz in the $Z_1$ axis direction (second direction) applied to the robot hand 202 (finger).

The robot arm 201 includes motors (FIG. 2) 211 provided so as to correspond to respective joints $J_1$ to $J_6$ and configured to drive the respective joints $J_1$ to $J_6$, position detectors 212 configured to detect respective rotational positions of the respective motors 211, and motor controllers 213 configured to control the rotation of the respective motors 211.

The respective motors 211 are servomotors such as brushless DC motors and AC motors. The position detectors 212 are each composed of a rotary encoder. The respective motor controllers 213 control the rotation of the corresponding motors 211 respectively so that angles of the corresponding joints $J_1$ to $J_6$ detected by the corresponding position detectors 212 produce trajectories acquired from the robot controller 300, that is, become angle command values (position command values).

Figure 3:
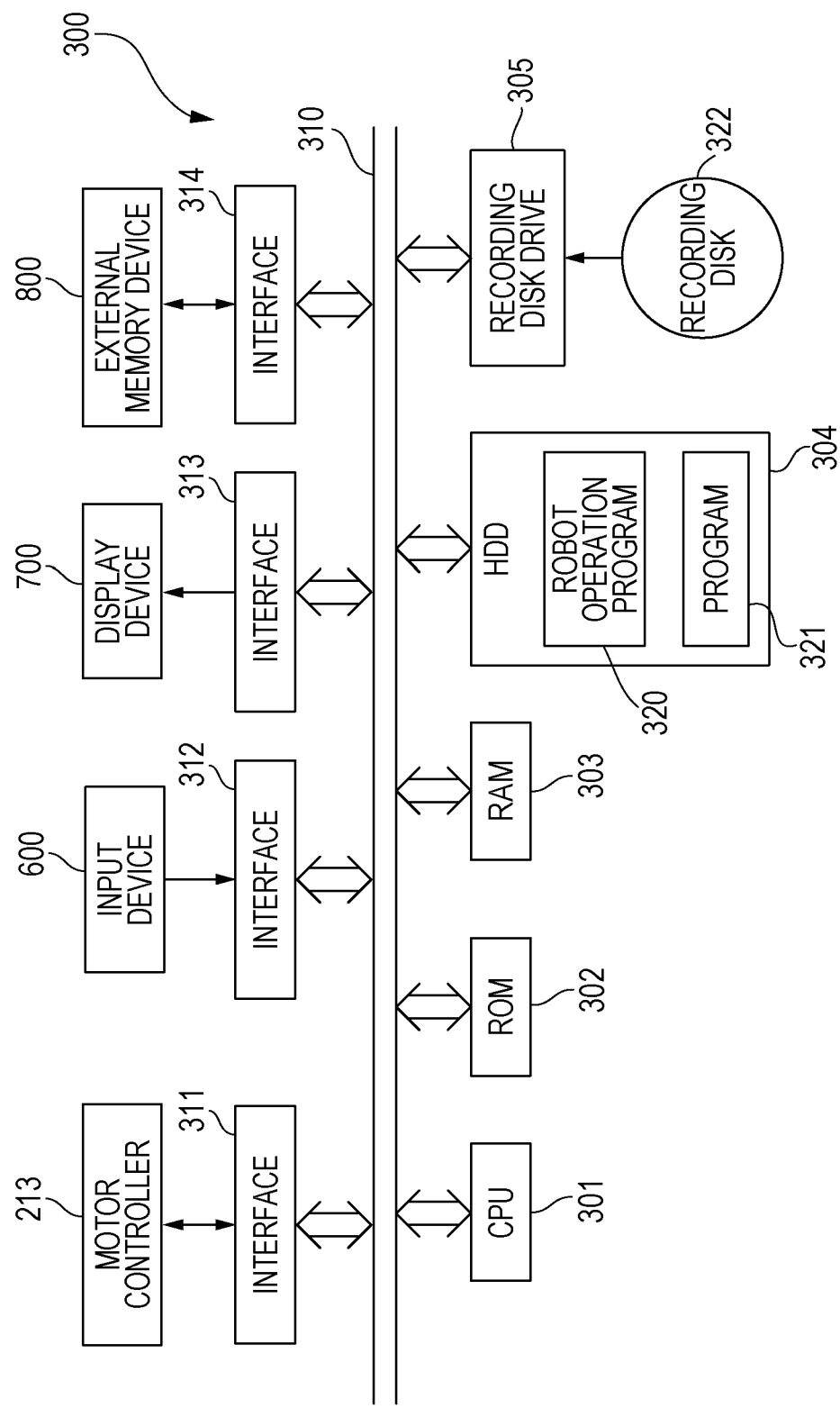
FIG. 3 is a block diagram illustrating a configuration of a robot controller of the robot apparatus according to the first embodiment of this disclosure.

FIG. 3 is a block diagram illustrating a configuration of the robot controller 300 of the robot apparatus 100 of the first embodiment of this disclosure. As illustrated in FIG. 3, the robot controller 300 is composed of a computer. The robot controller 300 is provided with a CPU (Central Processing Unit) 301 as a controller (operation part), which serves as a center of the computer. The robot controller 300 is also provided with a ROM (Read Only Memory) 302, a RAM (Random Access Memory) 303, and a HDD (Hard Disk Drive) 304 as memory units. The robot controller 300 is also provided with a recording disk drive 305 and various interfaces 311 to 314.

The ROM 302, the RAM 303, the HDD 304, the recording disk drive 305, and the interfaces 311 to 314 are connected to the CPU 301 via a bus 310.

An activation program such as BIOS is stored in the ROM 302. The RAM 303 is a memory device configured to temporarily memorize various data such as a result of arithmetic processing of the CPU 301. A program 321 is stored (recorded) on the HDD 304. The CPU 301 reads and executes the program 321 so that the robot controller 300 functions as the respective units 332, 333, 335, 336, 337, and 338 illustrated in FIG. 2, and executes processes in a robot control method described later. A robot operation program 320 created by a user is stored on the HDD 304. The recording disk drive 305 reads various data and programs recorded on a recording disk 322.

The respective motor controllers 213 of the robot 200 are connected to the interface 311. The CPU 301 outputs angle command values (position command values) of the joints $J_1$ to $J_6$ to the respective motor controllers 213 via the bus 310 and the interface 311 to control the action of the robot 200.

An input device 600 configured to transmit commands to the CPU 301 in accordance with operation of a mouse, a keyboard and the like performed by an operator is connected to the interface 312. A display device 700 such as a display for displaying an image is connected to the interface 313. A rewritable non-volatile memory such as a USB memory, or an external memory device 800 such as an external HDD, is connected to the interface 314.

The CPU 301 controls an action of the robot 200 (robot arms 201) so as to perform the fitting operation for fitting the fitting object $W_1$ gripped by the robot hand 202 and the fitted object $W_2$ to each other on the basis of trajectory data.

The trajectory data is created by the CPU 301 on the basis of the robot operation program 320. The robot operation program 320 is an action command which issues an instruction indicating how the robot 200 is to be moved, and is a program created by a user in a programming language specific to robots. When making the robot 200 perform some action, a controlling method such as position control or force control, and parameters such as position, speed, and target force are programmed in the robot operation program 320 to provide an action command.

Figure 2:
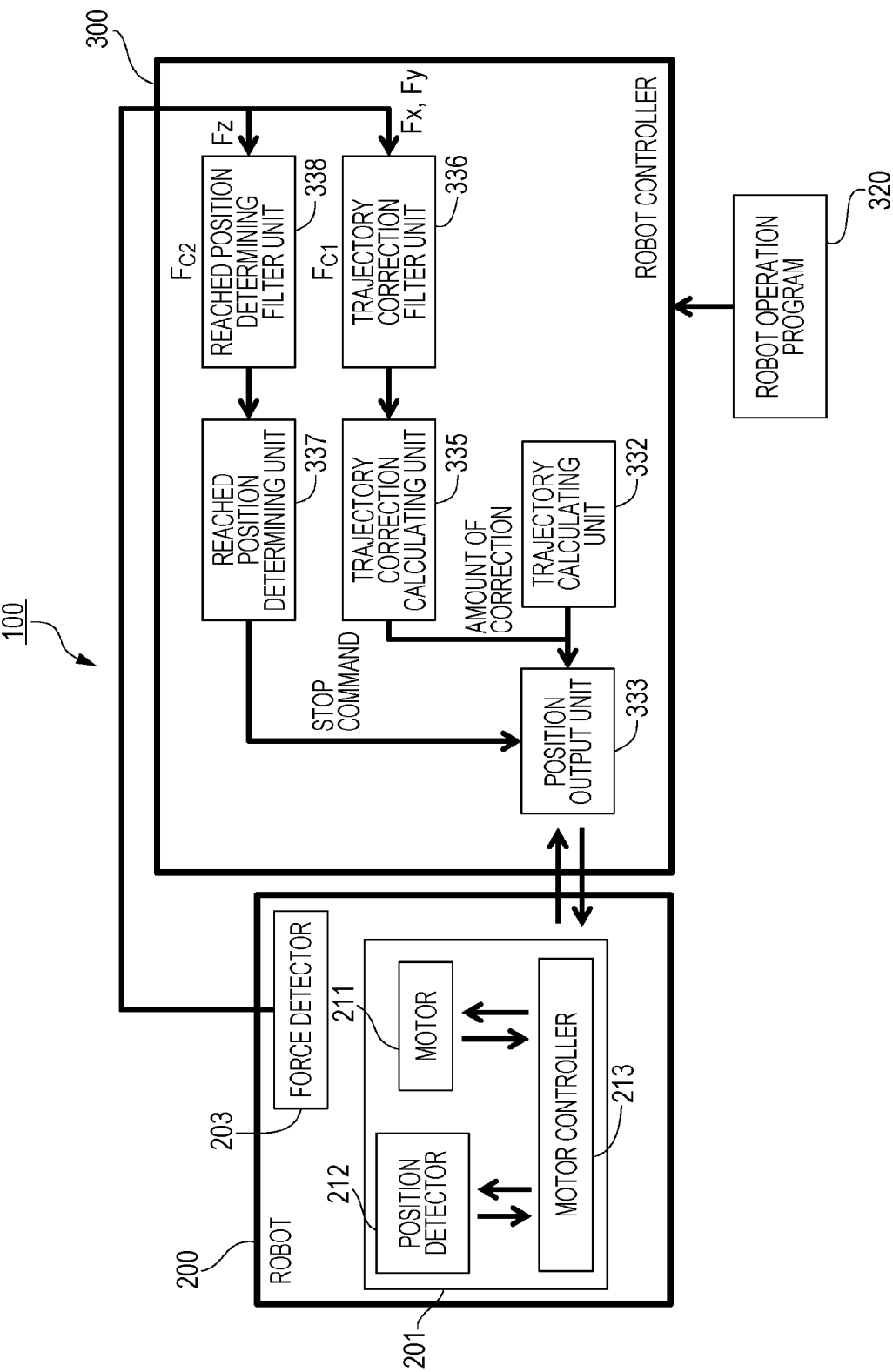
FIG. 2 is a block diagram illustrating the robot apparatus according to the first embodiment of this disclosure.

The CPU 301 executes a program 321 illustrated in FIG. 3 to function as the trajectory calculating unit 332, the position output unit 333, the trajectory correction calculating unit 335, the trajectory correction filter unit 336, the reached position determining unit 337, and the reached position determining filter unit 338 illustrated in FIG. 2.

The trajectory calculating unit 332 creates a route of the robot 200 (robot arm 201) on the basis of information written in the robot operation program 320 and creates a trajectory of the robot (robot arm 201) on the basis of the route of the robot 200.

Here, the term "the route of the robot 200" includes trajectories of the respective joints $J_1$ to $J_6$ of the robot 200. In other words, the term "the route of the robot 200" is an ordered set of points (poses) in a joint space expressing angles of the joints $J_1$ to $J_6$ according to the coordinate axes. The term "the trajectory of the robot 200" indicates poses with time as a parameter (routes). In the first embodiment, the trajectory of the robot 200 is a set of angle command values for the joints $J_1$ to $J_6$ of the robot 200 at a predetermined time interval (2 ms, for example).

Here, action control of the robot arm 201 by the CPU 301 roughly includes two methods, namely, position control and force control.

Position control is control that activates the robot arm 201 in accordance with the trajectory created by the robot operation program 320. Force control is control to be performed when making the robot arm 201 act in accordance with the trajectory created by the robot operation program 320 to correct the action on the basis of the forces Fx, Fy, and Fz detected by the force detector 203.

Force control includes trajectory correction control and reached position sensing control. Trajectory correction control corrects the trajectory of the robot arm 201 by moving the robot hand 202 in the $X_1$ axis and $Y_1$ axis directions so that the forces Fx and Fy, which are first detection forces, become smaller (approach zero). The reached position sensing control performs a threshold determination for the force Fz, which is a second detection force, and when Fz exceeds a threshold value, stops the movement of the robot hand 202 in the $Z_1$ axis direction.

For the user to make the CPU 301 (robot controller 300) control the robot 200 by position control, the user writes the execution of the position control in the robot operation program 320. The trajectory calculating unit 332 creates a trajectory toward a target position on the basis of the robot operation program 320 described in this manner.

The position output unit 333 notifies the motor controllers 213 of generated trajectories (angle command values) at a predetermined time interval (2 ms, for example). The motor controllers 213 execute feedback control on the motors 211 by using trajectories received form the position output unit 333 and current positions acquired from the position detectors 212.

During position control, the trajectory correction calculating unit 335, the trajectory correction filter unit 336, the reached position determining unit 337, and the reached position determining filter unit 338 illustrated in FIG. 2 do not function.

When the user makes the CPU 301 (robot controller 300) control the robot 200 by force control, the user specifies the execution of force control in the robot operation program 320. Execution of force control such as the reached position sensing control and trajectory correction control is specified in the robot operation program 320.

The CPU 301 analyzes information described in the robot operation program 320. When the reached position sensing control is specified in the robot operation program 320, the reached position determining filter unit 338 sets a low-pass filter specified in the robot operation program 320. When the trajectory correction control is specified in the robot operation program 320, the trajectory correction filter unit 336 sets a low-pass filter specified in the robot operation program 320. In the first embodiment, when performing the fitting operation for fitting the fitting object $W_1$ and the fitted object $W_2$ to each other, both of trajectory correction control and reached position sensing control are executed simultaneously.

The trajectory correction filter unit 336 and the reached position determining filter unit 338 function as a low-pass filter (digital filter) for cutting high-frequency noise components in data of forces Fx, Fy, and Fz output from the force detector 203. Cutoff frequencies $F_{c1}$ and $F_{c2}$ are specified for the respective filter portions 336 and 338 as parameters, and the parameters may be specified in the robot operation program 320. Specifically, the trajectory correction filter unit 336 acts as a first low-pass filter having a cutoff frequency of $F_{c1}$ as a first cutoff frequency $F_{c1}$ and executes a filtering process for the forces Fx and Fy. The reached position determining filter unit 338 acts as a second low-pass filter having a cutoff frequency of $F_{c2}$ as a second cutoff frequency $F_{c2}$ and executes a filtering process for the force Fz.

When the force control is specified, the trajectory calculating unit 332 creates a trajectory in the same manner as the position control according to the action command described in the robot operation program 320. The position output unit 333 notifies the motor controllers 213 of the angle command values at a predetermined time interval (2 ms, for example). The motor controllers 213 perform feedback control on rotation of the motors 211 and activate the robot 200.

At the same time, the filter units 336 and 338 acquire the forces Fx, Fy, and Fz applied to the robot 200 from the force detector 203. Specifically, the trajectory correction filter unit 336 acquires the forces Fx and Fy, and the reached position determining filter unit 338 acquires the force Fz.

The trajectory correction filter unit 336 uses the first low-pass filter having the cutoff frequency $F_{c1}$ as the cutoff frequency $F_{c1}$ and executes a filtering process for the forces Fx and Fy during the fitting operation (first detection force correcting process, first detection force correcting step). At the same time, the reached position determining filter unit 338 uses the second low-pass filter having the cutoff frequency $F_{c2}$ and executes a filtering process for the force Fz (second detection force correcting process, second detection force correcting step).

The trajectory correction calculating unit 335 calculates an amount of trajectory correction which matches (is proportional to) the data on the forces Fx and Fy acquired through the trajectory correction filter unit 336, and adds the amount of trajectory correction to the trajectory calculated by the trajectory calculating unit 332 to correct the trajectory. In other words, the trajectory correction calculating unit 335 corrects the trajectory of the robot arm 201 so as to move the robot hand 202 in the $X_1$ axis and $Y_1$ axis directions so that the forces Fx and Fy become smaller (approach zero) during the fitting operation (first force control process, first force control step).

The position output unit 333 notifies the motor controllers 213 of the corrected trajectory data (corrected angle command value). Accordingly, the motor controllers 213 control the rotation of the motors 211 on the basis of the corrected trajectory data. In this manner, the CPU 301 executes the trajectory correction control on the basis of the force control.

In contrast, the reached position determining unit 337 compares a force target value (threshold value) specified in the robot operation program 320 with the data on the force Fz acquired through the reached position determining filter unit 338. The reached position determining unit 337 issues a stop command for stopping the movement of the robot hand 202 in the $Z_1$ axis direction to the position output unit 333 at the timing when the force Fz exceeds the force target value (threshold value). In other words, the reached position determining unit 337 performs a threshold value determination for the force Fz during the fitting operation and controls the action of the robot arm 201 so that the movement of the robot hand 202 in the $Z_1$ axis direction stops when the force Fz exceeds the threshold value (second force control process, second force control step).

In the first embodiment, the reached position determining unit 337 issues a stop command for stopping the movement of the robot hand 202 also in the $X_1$ axis direction and the $Y_1$ axis direction. In other words, in the first embodiment, the stop command is a command for stopping the action of the robot arm 201.

The position output unit 333 issues an instruction to stop to the respective motor controllers 213 upon reception of the stop command, and the respective motor controller 213 stops the motors 211. In this manner, the CPU 301 executes the reached position sensing control on the basis of the force control.

In this case, the motor controllers 213 may reduce the speeds of the respective motors 211 when the motor controllers 213 receive a stop command from the position output unit 333 without stopping the motors 211 immediately. A configuration is also applicable in which when the position output unit 333 receives the stop command from the reached position determining unit 337, a speed reduction trajectory is calculated by the trajectory calculating unit 332, and the motor controllers 213 are notified of the calculated trajectory for stopping the motors 211.

Figure 4:
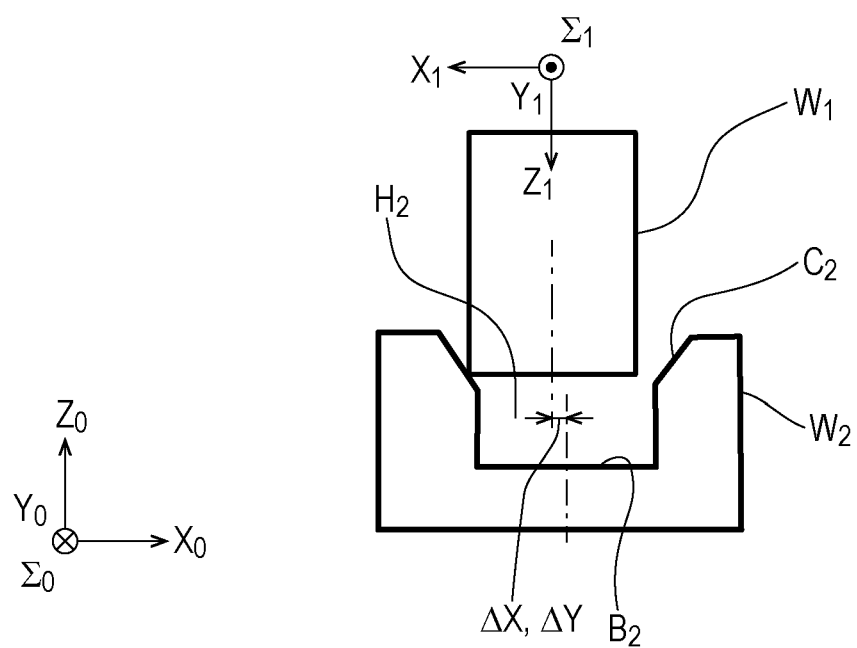
FIG. 4 is an explanatory drawing illustrating a state of performing a fitting operation for fitting the fitting object and a fitted object to each other according to the first embodiment of this disclosure.

A force control to be performed in the case where the robot controller 300 performs the fitting operation in which the robot hand 202 grips the fitting object $W_1$ and fits the fitting object $W_1$ into the hole $H_2$ of the fitted object $W_2$ will be described in detail. FIG. 4 is an explanatory drawing illustrating a state of performing a fitting operation for fitting the fitting object $W_1$ and the fitted object $W_2$ to each other.

As illustrated in FIG. 4, the hole $H_2$ of the fitted object $W_2$ is a depressed hole and includes a bottom portion $B_2$. The hole $H_2$ is provided with a chamfered portion $C_2$ to introduce the fitting object $W_1$ formed at an opening end thereof. The chamfered portion needs only to be formed on at least one of the fitting object $W_1$ and the fitted object $W_2$, and hence may be formed only on the fitting object $W_1$ and may be formed on both of the fitting object $W_1$ and the fitted object $W_2$.

The fitting object $W_1$ and the fitted object $W_2$ are supplied by a supply device respectively, which is not illustrated. The fitting object $W_1$ supplied to a position of acquisition is gripped by the robot hand 202, and the fitted object $W_2$ is supplied to a position of assembly.

With such a supplying method, the positional displacement of the fitting object $W_1$ with respect to the robot hand 202 or the positional displacement of the fitted object $W_2$ with respect to the position of assembly may cause a relative positional displacement of the fitting object $W_1$ with respect to the fitted object $W_2$. The fitting object $W_1$ and the fitted object $W_2$ are varied by an extend corresponding to tolerance at the time of manufacture.

From the cause described above, a relative positional displacement may occur in each of a direction of assembly of the fitting object $W_1$ with respect to the fitted object $W_2$ ($Z_1$ axis direction illustrated in FIG. 4) and directions of a plane perpendicular to the direction of assembly ($X_1$ and $Y_1$ axes directions illustrated in FIG. 4). When the fitting operation is performed only with the position control, there is a case where the fitting object $W_1$ is not fitted into the hole $H_2$ of the fitted object $W_2$.

Therefore, in the first embodiment, two types of force control, that is, the trajectory correction control that corrects relative displacements ΔX and ΔY of the center axis of the fitting object $W_1$ with respect to the center axis of the hole $H_2$ in the $X_1$ and $Y_1$ axes directions and the reached position sensing control in the $Z_1$ axis direction are performed simultaneously.

The sensitivity of the force detection via the digital filter here, is determined by the cutoff frequency of the digital filter. In other words, the higher the cutoff frequency, the higher the sensitivity becomes and, in contrast, the lower the cutoff frequency, the lower the sensitivity becomes.

In the case of performing the reached position sensing control, if the sensitivity that senses contact is low, the fitting object $W_1$ is continuously pressed against a bottom portion $B_2$, and hence the state in which the robot hand 202 and the force detector 203, that is, the robot 200 is overloaded is continued.

In the first embodiment, the cutoff frequency $F_{c2}$ of the low-pass filter in the reached position determining filter unit 338 used for the reached position sensing control is set to a frequency higher than the cutoff frequency $F_{c1}$ so that a steep change of the force may be sensed.

In the trajectory correction control that corrects the displacement between the fitting object $W_1$ and the hole $H_2$ of the fitted object $W_2$ in the $X_1$ and $Y_1$ axes directions, a lower end of the fitting object $W_1$ comes into contact with the chamfered portion $C_2$ because of the influence of the relative positional displacement, which generates forces Fx and Fy in the direction of the $X_1$ and $Y_1$ axes directions. The generated forces Fx and Fy are detected by the force detector 203, and the trajectory correction calculating unit 335 performs the trajectory correction control.

Since the force detector 203 is installed in the robot 200, noises caused by vibrations of the robot 200 (robot arm 201) are simultaneously detected in addition to the force generated by the contact with the chamfered portion $C_2$. Therefore, the cutoff frequency $F_{c1}$ of the low-pass filter to be used in the trajectory correction filter unit 336 is set to a frequency lower than the cutoff frequency $F_{c2}$ so that the steep change of the force is ignored.

For example, the cutoff frequency $F_{c1}$ is set to 20 Hz and the cutoff frequency $F_{c2}$ is set to 100 Hz. The cutoff frequencies $F_{c1}$ and $F_{c2}$ may be determined by performing an experiment.

As described thus far, according to the first embodiment, the first low-pass filter to be used in the trajectory correction filter unit 336 and the second low-pass filer to be used in the reached position determining filter unit 338 are set separately. The cutoff frequency $F_{c2}$ of the second low-pass filter is set to a frequency higher than the cutoff frequency $F_{c1}$ of the first low-pass filter.

Accordingly, in the trajectory correction control, noises having a high frequency higher than the frequency $F_{c1}$ in the forces Fx and Fy detected by the force detector 203 are cut by the trajectory correction filter unit 336. Therefore, a stable trajectory correction is achieved.

In the reached position sensing control, noises having frequencies not lower than the frequency $F_{c2}$ are cut in the force Fz detected by the force detector 203 by the trajectory correction filter unit 336, and frequency components from the frequencies $F_{c1}$ to $F_{c2}$ remains without being cut. Therefore, the force can be detected with higher sensitivity than the filter used in the trajectory correction filter unit 336. Accordingly, the force Fz generated when reaching the reached position in the $Z_1$ axis direction can be sensed with high sensitivity.

In this manner, since the reached position sensing control with high sensitivity and the stable trajectory correction control are performed simultaneously, the stable fitting operation for fitting the fitting object $W_1$ reached position sensing control $w_1$ and the fitted object $W_2$ to each other is achieved.

Second Embodiment

Figure 5:
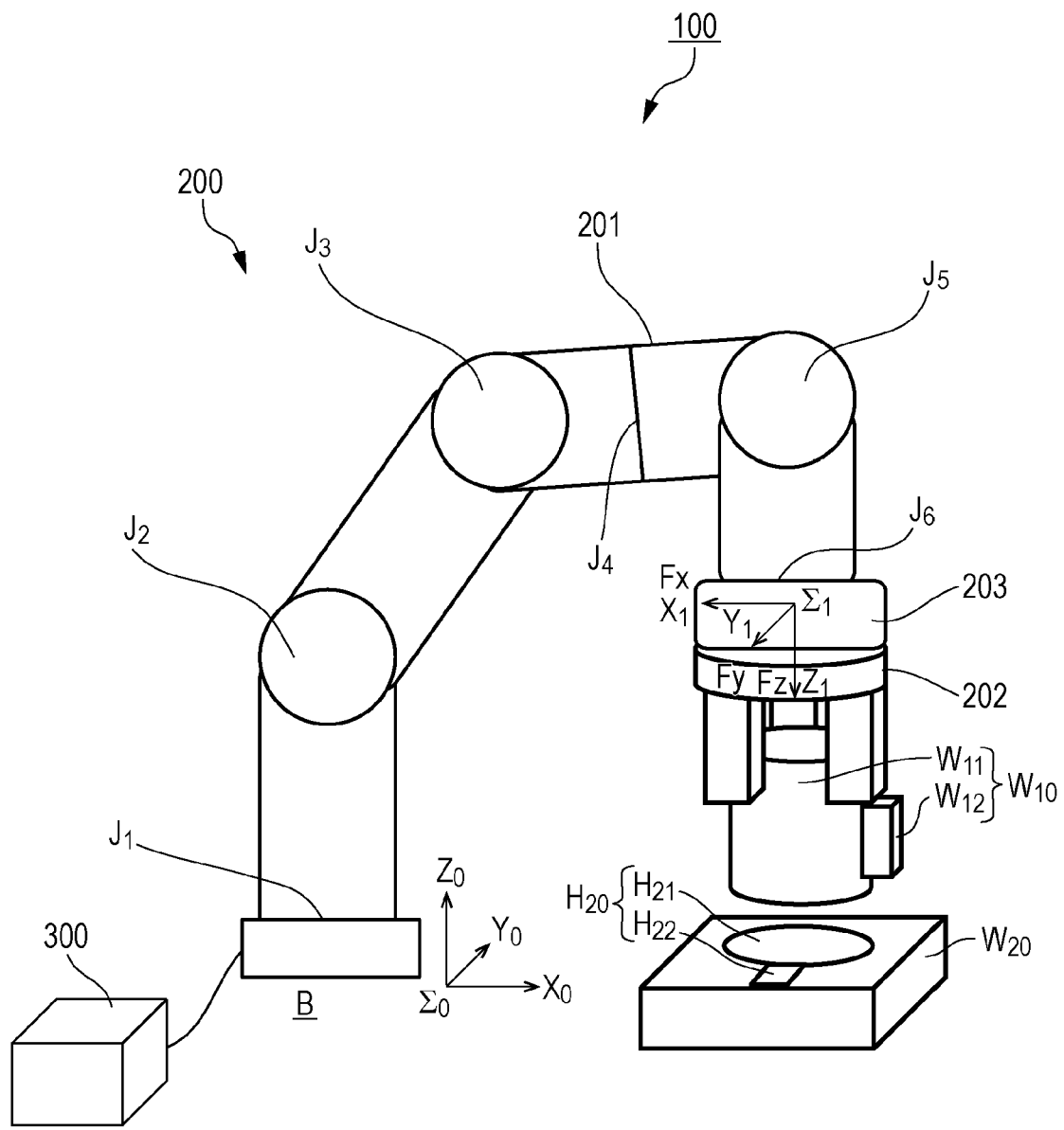
FIG. 5 is a schematic drawing illustrating a robot apparatus according to a second embodiment of this disclosure.

Robot control of a robot apparatus according to a second embodiment of this disclosure will be described. FIG. 5 is a schematic drawing illustrating the robot apparatus according to the second embodiment of this disclosure. Since the robot apparatus of the second embodiment have the same configuration as the robot apparatus of the first embodiment described above, the same reference numerals are used and the description will be omitted. In the second embodiment, shapes of a fitting object and a fitted object for a fitting operation are different from those in the first embodiment. A robot hand 202 rotates about the $Z_1$ axis by the rotation of a distal link of a robot arm 201 about a joint $J_6$.

A fitting object $W_{10}$ includes a column-shaped column portion $W_{11}$ and a boss $W_{12}$ which is a projection formed so as to project from an outer peripheral surface of an intermediate portion between a distal end portion and a rear end portion in a direction of extension of a center axis of the column portion $W_{11}$. A fitted object $W_{20}$ is provided with a hole $H_{20}$. The hole $H_{20}$ includes a column-shaped column hole $H_{21}$ to which the column portion $W_{11}$ fits, and a boss hole $H_{22}$ which is connected to the column hole $H_{21}$ and a groove to which the boss $W_{12}$ fits.

In the second embodiment, a gripped object gripped by the robot hand 202 is the fitting object $W_{10}$, and the counterpart object is the fitted object $W_{20}$. In the second embodiment, an operation for fitting the column portion $W_{11}$ to the column hole $H_{21}$ as the fitting operation, and fitting the boss $W_{12}$ to the boss hole $H_{22}$ is performed.

An action for fitting the boss $W_{12}$ in the boss hole $H_{22}$ while rotating and pressing the fitting object $W_{10}$ will be described below.

The CPU 301 performs the fitting operation for causing the robot hand 202 to grip the fitting object $W_{10}$ having the boss $W_{12}$, and fitting the fitting object $W_{10}$ gripped by the robot hand 202 into the hole $H_{20}$ provided in the fitted object $W_{20}$. The fitting operation is completed by fitting the boss $W_{12}$ in the boss hole $H_{22}$.

The column hole has a depressed hole like the hole $H_2$ of the above-described first embodiment, and the column hole $H_{21}$ is provided with the chamfered portion for introducing the distal end portion of the column portion $W_{11}$ formed at an opening end thereof. The chamfered portion needs only to be formed on at least one of the column portion $W_{11}$ and the column hole $H_{21}$, and hence may be formed only on the column portion $W_{11}$ and may be formed on both of the column portion $W_{11}$ and the column hole $H_{21}$.

The fitting object $W_{10}$ and the fitted object $W_{20}$ are supplied in the same manner as the above-described first embodiment. A relative misalignment occurs between the fitting object $W_{10}$ and the fitted object $W_{20}$ by the influence of a tolerance of the fitting object $W_{10}$ and the fitted object $W_{20}$, a gripping position of the fitting object $W_{10}$, and a position of installation of the fitted portion $W_{20}$. Therefore, in the second embodiment as well, the fitting operation is performed by the two types of force control, namely, the reached position sensing control and the trajectory correction control.

The boss $W_{12}$ is attached at a position apart upward from the distal end portion of the column portion $W_{11}$ (lower end portion) by a certain distance above.

Figure 6A:
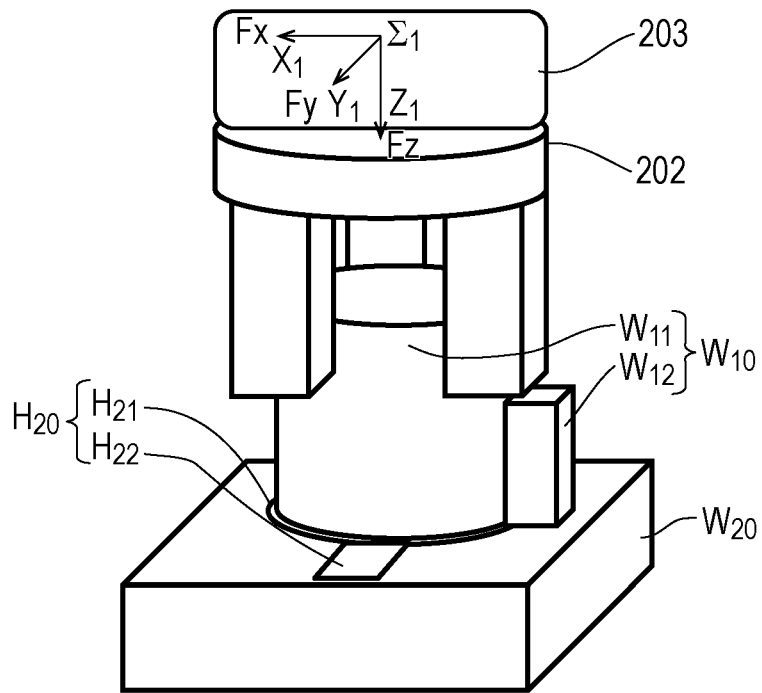
FIGS. 6A and 6B are explanatory drawings for explaining a fitting operation for fitting the fitting object and the fitted object to each other according to the second embodiment of this disclosure.
Figure 6B:
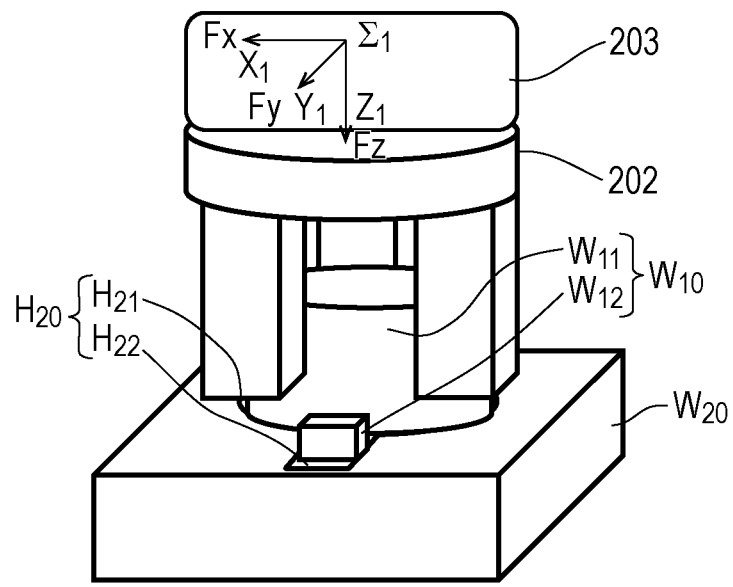

FIGS. 6A and 6B are explanatory drawings for explaining a fitting operation for fitting the fitting object $W_{10}$ and the fitted object $W_{20}$ to each other according to the second embodiment of this disclosure. FIG. 6A illustrates a state in which the fitting operation is being performed, and FIG. 6B illustrates a state that the fitting operation is completed.

The CPU 301 performs two steps, namely, a step of fitting the distal end portion of the column portion $W_{11}$ in the column hole $H_{21}$ of the hole $H_{20}$ as illustrated in FIG. 6A, and then performs a step of phase alignment for fitting the boss $W_{12}$ in the boss hole $H_{22}$ as illustrated in FIG. 6B.

Since a process of fitting the distal end portion of the column portion $W_{11}$ illustrated in FIG. 6A into the hole $H_{20}$ performs the fitting operation by almost the same method as the contents described in the first embodiment described above, detailed description will be omitted. As a point different from the above-described first embodiment, the CPU 301 stops the action of the robot arm 201 when the boss $W_{12}$ is brought into contact with the upper surface of the fitted object $W_{20}$ by the reached position sensing control in the second embodiment. In other words, the reached position determining unit 337 causes the distal end portion of the column portion $W_{11}$ to be fitted into the column hole $H_{21}$ and when the force Fz exceeds a threshold value, stops the movement of the fitting object $W_{10}$ in the $Z_1$ axis direction.

When fitting the boss $W_{12}$ in the boss hole $H_{22}$, the CPU 301 rotates the fitting object $W_{10}$ about the $Z_1$ axis in a state in which the distal end portion of the column portion $W_{11}$ of the fitting portion $W_{10}$ gripped by the robot hand 202 as illustrated in FIG. 6B is fitted into the column hole $H_{21}$.

In other words, the CPU 301 causes the distal end portion of the column portion $W_{11}$ in the column hole $H_{21}$ during the fitting operation to fit, and when the movement of the fitting object $W_{10}$ in the $Z_1$ axis direction is stopped in the second force control process, causes the fitting object $W_{10}$ to rotate about the $Z_1$ axis until the force Fz is weakened to a level below the threshold value. Specifically, the robot hand 202 is rotated about the $Z_1$ axis with respect to the robot arm 201.

When the boss $W_{12}$ reaches the boss hole $H_{22}$, the force Fz in the $Z_1$ axis direction is released upon reaching the boss hole $H_{22}$ and the force Fz is weakened to a level below the threshold value. By sensing the force Fz by the force control that senses the reached position, the phase for fitting the boss $W_{12}$ in the boss hole $H_{22}$ can be sensed.

When sensing the phase of the boss hole $H_{22}$ here, if the sensitivity of the reached position sensing is low, the CPU does not sense a force of a level lower than the threshold value and passes over the fact that an assembly phase is reached, so that the phase of the boss hole $H_{22}$ may not be sensed. Therefore, in the same manner as the above-described first embodiment, a cutoff frequency $F_{c2}$ of the filter used in the reached position determining filter unit 338 used for the reached position detection is set to be higher than the cutoff frequency $F_{c1}$ so that a steep change of the force may be sensed. Subsequently, the fitting object $W_{10}$ is pushed in the $Z_1$ axis direction in the sensed phase, and the threshold value determination is performed again, so that the fitting operation that fits the fitting object $W_{10}$ into the hole $H_{20}$ is completed.

Here, when rotating the fitting object $W_{10}$, if a rotational axis rotated the fitting object $W_{10}$ and a rotational axis of the hole $H_{20}$ are not aligned, the forces Fx and Fy in the $X_1$, $Y_1$ axes directions may occur during the rotation.

Therefore, in the second embodiment, in order to avoid the robot hand 202 and the force detector 203, that is, the robot 200 from being overloaded, the trajectory correction control for correcting the displacement of the rotational axis is executed at the same time as the rotation of the fitting object $W_{10}$.

In the trajectory correction control, the noises caused by the vibrations of the robot 200 at the time of rotation is detected, and the force other than the force generated by the contact between the fitting object $W_{10}$ and the hole $H_{20}$ is detected simultaneously. Therefore, in the same manner as the above-described first embodiment, the cutoff frequency $F_{c1}$ of the filter to be used in the trajectory correction filter unit 336 is lowered so that the steep change of the force is ignored.

By setting the cutoff frequency $F_{c1}$ and $F_{c2}$ as described above, a fitting operation that senses the phase for assembling the boss $W_{12}$ by the reached position sensing at high sensitivity and at the same time, the fitting operation that absorbs the displacement of the rotational axis generating due to the relative position displacement between the fitting object $W_{10}$ and the hole $H_{20}$.

This disclosure is not limited to the embodiment described above, and may be modified in various manners within the technical thought of this disclosure.

In the above-described second embodiment the reached position sensing has been performed by sensing the force Fz. However, the reached position sensing may be performed by using not only an amount of temporal change not only, but also the force Fz. In the reached position sensing used in the above-described second embodiment, the force Fz in a direction of insertion is monitored, and sensed. However, the reached position sensing may be executed by using the power component in a direction of rotation about a Z axis.

Although the case where the fitting operation for fitting the fitting object and the fitted object to each other is performed by the robot hand gripping the fitting object has been descried in the above-described first and second embodiment, this disclosure is not limited thereto. Even in the case where the robot hand grips the fitted object to perform the fitting operation, this disclosure is also applicable.

The respective processing actions of the above-described embodiments are executed specifically by the CPU 301. Therefore, the respective processing actions of the above-described embodiments may be achieved by supplying a recording medium in which the program that realizes the above-described functions is recorded to the robot controller, and reading out and by a computer which constitutes part of the robot controller executing the program stored in the recording medium. In this case, the program itself read out from the recording medium realizes the functions of the above-described embodiments, so that the program itself and the recording medium in which the program is recorded constitute part of this disclosure.

The case where the computer-readable recording medium is the HDD 304 and the program 321 is stored in the HDD 304 has been described in the above-described embodiment. However, this disclosure is not limited thereto. The program may be recorded as long as the recording medium is computer readable. For example, as the recording medium for supplying the program, the ROM 302, the recording disk 322, and the external memory device 800 illustrated in FIG. 3 may be used. Specifically, examples of the recording medium include a flexible disk, a hard disk, an optical disk, a magneto-optical disk, a CD-ROM, a CD-R, a magnetic tape, a rewritable non-volatile memory (for example, the USB memory), and an ROM.

It is also possible to download the program in the above-descried embodiments via a network and cause the computer to execute the program.

This disclosure is not limited to realize the functions of the above-described embodiments by executing the program code read out by the computer. Subsequently, an OS (operating system) or the like which is working on the computer executes part or the entire part of the actual process on the basis of the instruction of the program code whereby the functions of the embodiments described above are realized by the processing is also included in this disclosure.

It is assumed that the program code read out from the recording medium may be written in a memory provided on a function enhancement board inserted into the computer or a function enhancement unit connected to the computer. The case where the CPU or the like provided on the function enhancement board or the function enhancement unit executes part or the entire part of the actual process on the basis of the instruction of the program code whereby the functions of the embodiments described above are realized by the processing is also included in this disclosure.

The case where the computer performs processing by executing the program recorded in the recording medium such as the HDD has been described in the above-described embodiment. However, this disclosure is not limited thereto. Part or all the functions of the operation part acting on the basis of the program may be achieved by a specific LSI such as ASIC or FPGA. The term ASIC is an acronym of Application Specific Integrated Circuit, and the term FPGA is an acronym of Field-Programmable Gate Array.

Advantageous Effects of Invention

According to this disclosure, since a reached position sensing control with high sensitivity and a stable trajectory correction control are performed simultaneously, a stable fitting operation for fitting a gripped object and a counterpart object to each other is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-187509 filed Sep. 16, 2014, which is hereby incorporated by reference herein in its entirety.

What is claimed is:
1. A robot apparatus comprising:
a robot arm that includes a plurality of joints;
a robot hand attached to a distal end of the robot arm;
a force detector configured to detect a first detection force in a first direction intersecting a distal end shaft extending from the robot arm to the robot hand and a second detection force in a second direction in which the distal end shaft extends; and
a control unit configured to control an operation of the robot arm so as to perform a fitting operation for fitting a gripped object gripped by the robot hand and a counterpart object to each other on the basis of trajectory data of the robot arm, and
wherein
the control unit executes a first detection force correcting process that performs a filtering process for the first detection force with a first low-pass filter having a first cutoff frequency during the fitting operation;

a first force control process that moves the robot hand in the first direction to reduce the first detection force to correct a trajectory of the robot arm during the fitting operation;

a second detection force correcting process that performs a filtering process for the second detection force with a second low-pass filter having a second cutoff frequency higher than the first cutoff frequency during the fitting operation; and a second force control process that stops the movement of the robot hand in the second direction when the second detection force exceeds a threshold value during the fitting operation, wherein one of the gripped object and the counterpart object is a fitting object, and the other one is a fitted object having a hole into which the fitting object is fitted, and the control unit performs an operation for causing the fitting object to be fitted into the hole of the fitted object.

2. The robot apparatus according to claim 1, wherein the fitting object includes a column-shaped column portion and a projection formed so as to project from an outer peripheral surface of an intermediate portion between a distal end portion and a rear end portion of the column portion, the hole includes a column-shaped column hole allowing the column portion to fit in and a groove communicating with the column hole and allowing the projection to fit in, and the control unit rotates the gripped object about the distal end shaft until the second detection force is weakened to a level below the threshold value when the distal end portion of the column portion is fitted into the column hole and the movement of the gripped portion in the second direction is stopped by the second force controlling process during the fitting operation including causing the distal end portion of the column portion to be fitted into the column hole and the projection to be fitted into the groove as the fitting operation.

3. A method of controlling a robot including a robot hand attached to a distal end of a robot arm that includes a plurality of joints via a force detector, the force detector being configured to detect a first detection force in a first direction intersecting a distal end shaft extending from the robot arm to the robot hand and a second detection force in a second direction in which the distal end shaft extends; and a control unit configured to control an operation of the robot arm so as to perform a fitting operation for fitting a gripped object gripped by the robot hand and a counterpart object to each other on the basis of trajectory data of the robot arm, the method comprising:

a first detection force correcting step in which the control unit performs a filtering process for the first detection force with a first low-pass filter having a first cutoff frequency during the fitting operation;

a first force control step in which the control unit moves the robot hand in the first direction to reduce the first detection force to correct a trajectory of the robot arm during the fitting operation;

a second detection force correcting step in which the control unit performs a filtering process for the second detection force with a second low-pass filter having a second cutoff frequency which is higher than the first cutoff frequency during the fitting operation; and a second force control step in which the control unit stops the movement of the robot hand in the second direction when the second detection force exceeds a threshold value during the fitting operation, wherein one of the gripped object and the counterpart object is a fitting object, and the other one is a fitted object having a hole into which the fitting object is fitted, and the control unit performs an operation for causing the fitting object to be fitted into the hole of the fitted object.

4. A non-transitory computer-readable recording medium storing instructions that, when executed by a computer, cause the computer to perform a method of controlling a robot including a robot hand attached to a distal end of a robot arm that includes a plurality of joints via a force detector, the force detector being configured to detect a first detection force in a first direction intersecting a distal end shaft extending from the robot arm to the robot hand and a second detection force in a second direction in which the distal end shaft extends; and a control unit configured to control an operation of the robot arm so as to perform a fitting operation for fitting a gripped object gripped by the robot hand and a counterpart object to each other on the basis of trajectory data of the robot arm, the method comprising:

a first detection force correcting step in which the control unit performs a filtering process for the first detection force with a first low-pass filter having a first cutoff frequency during the fitting operation;

a first force control step in which the control unit moves the robot hand in the first direction to reduce the first detection force to correct a trajectory of the robot arm during the fitting operation;

a second detection force correcting step in which the control unit performs a filtering process for the second detection force with a second low-pass filter having a second cutoff frequency which is higher than the first cutoff frequency during the fitting operation; and a second force control step in which the control unit stops the movement of the robot hand in the second direction when the second detection force exceeds a threshold value during the fitting operation, wherein one of the gripped object and the counterpart object is a fitting object, and the other one is a fitted object having a hole into which the fitting object is fitted, and the control unit performs an operation for causing the fitting object to be fitted into the hole of the fitted object.

* * * * *